A. McC. FLUHARTY.
PEDAL CRANK HANGER.
APPLICATION FILED SEPT. 9, 1910.
985,335.
Patented Feb. 28, 1911.
2 SHEETS—SHEET 1.
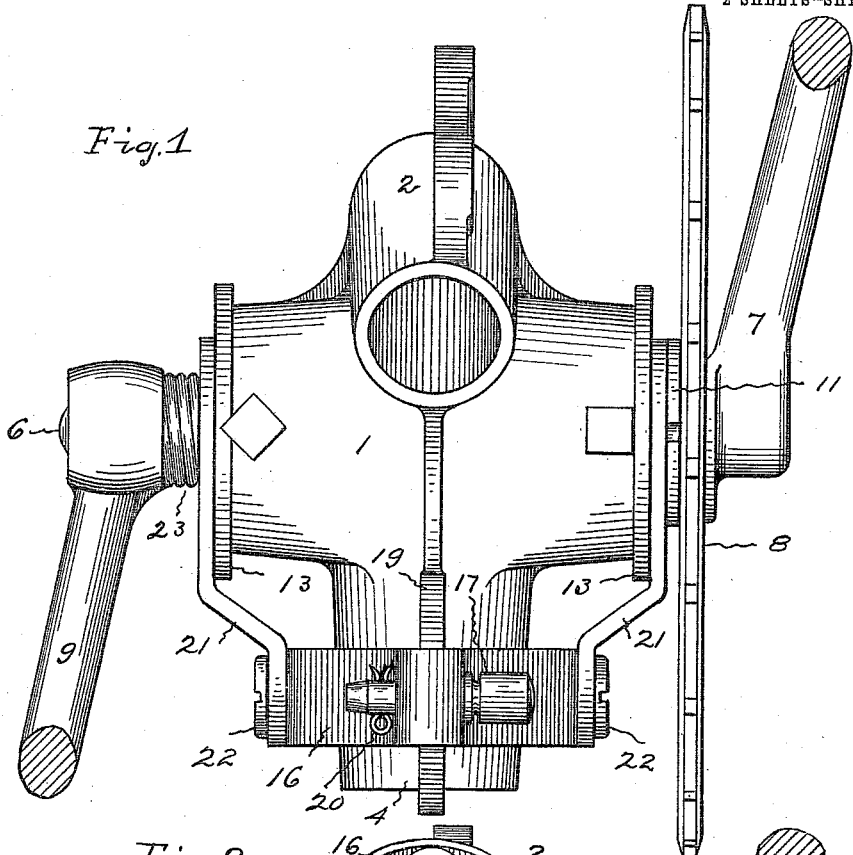
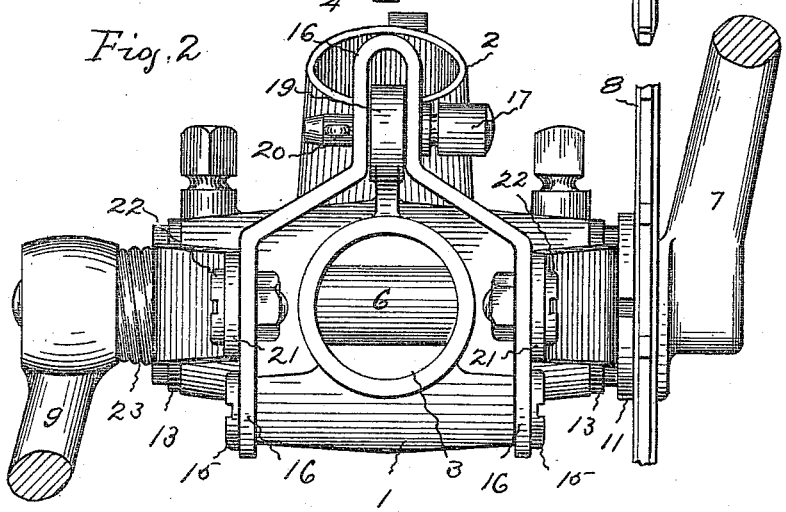

A. McC. FLUHARTY.
PEDAL CRANK HANGER.
APPLICATION FILED SEPT. 9, 1910.
985,335.
Patented Feb. 28, 1911.
2 SHEETS—SHEET 2.
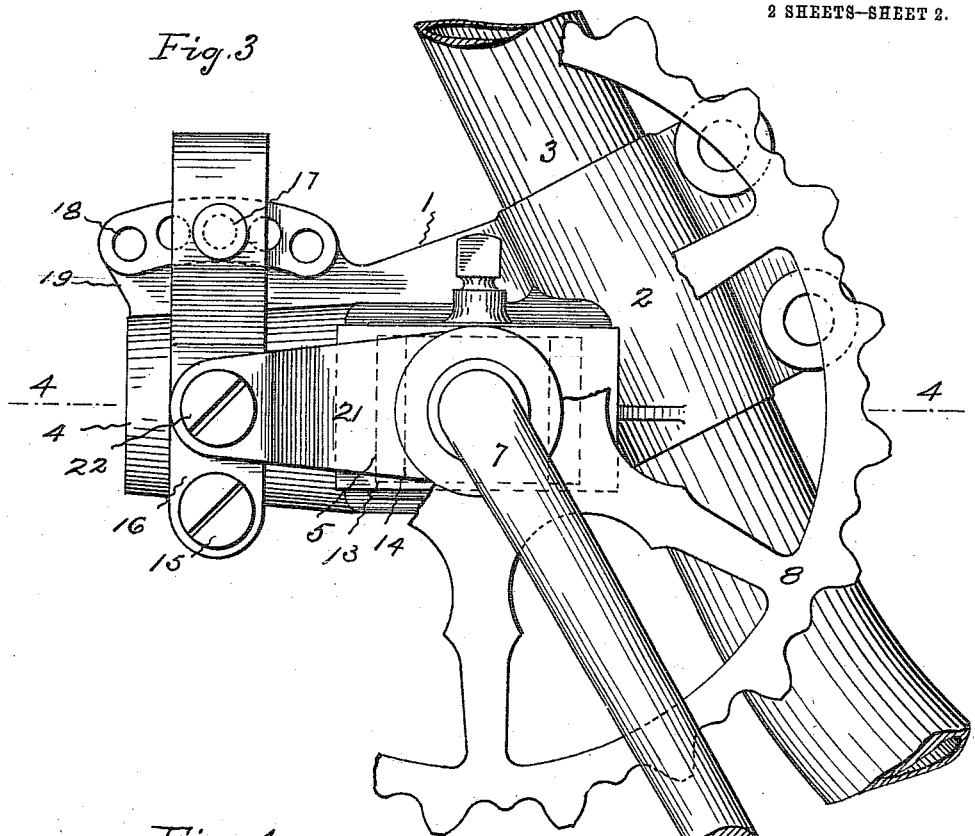
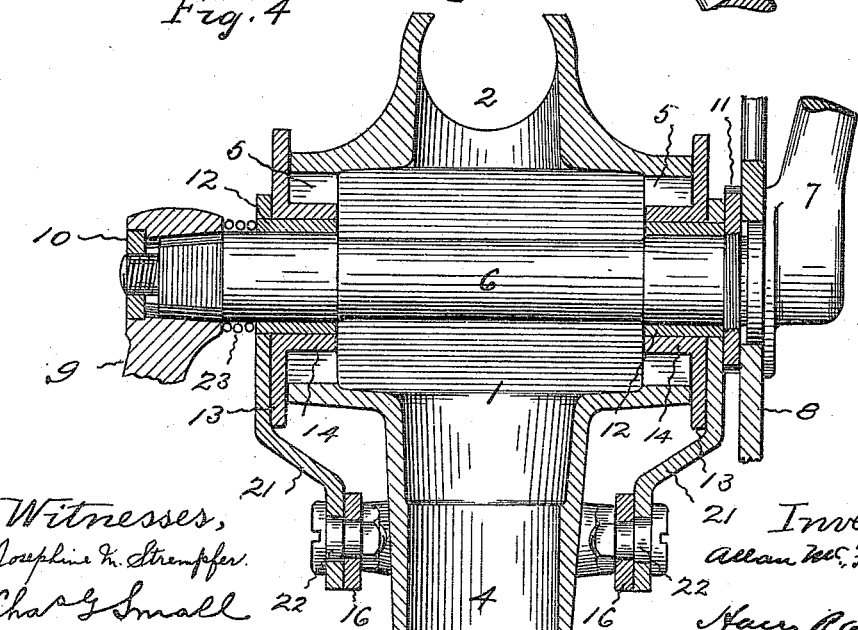

UNITED STATES PATENT OFFICE.

ALLAN McCLURE FLUHARTY, OF WESTFIELD, MASSACHUSETTS, ASSIGNOR TO THE POPE MANUFACTURING COMPANY, OF HARTFORD, CONNECTICUT, A CORPORATION OF CONNECTICUT.

PEDAL CRANK-HANGER.

985,335.  Specification of Letters Patent.  Patented Feb. 28, 1911.

Application filed September 9, 1910. Serial No. 581,300.

*To all whom it may concern:*

Be it known that I, ALLAN McCLURE FLUHARTY, a citizen of the United States, residing at Westfield, in the county of Hampden and State of Massachusetts, have invented a new and useful Improvement in Pedal Crank-Hangers, of which the following is a specification.

This invention relates more particularly to those pedal crank-hangers provided for motor cycles, which are so constructed that the pedal shaft can be adjusted for the purpose of giving the right tension to the pedal chain.

The object of the invention is to provide a pedal crank-hanger of this nature which is simple, cheap to build, and which can be quickly adjusted for regulating the tension of the pedal chain.

The invention resides in a hanger bracket, provided with horizontally movable guides which carry the pedal shaft with its pedals and sprocket, and an adjusting lever which is connected by links with the pedal shaft in such manner that by simply releasing and swinging the lever, the shaft may be moved horizontally to the necessary position to give the chain the desired tension.

Figure 1 of the accompanying drawings shows a plan of a hanger which embodies the invention. Fig. 2 shows a rear elevation of the same. Fig. 3 shows a side elevation, and Fig. 4 shows a horizontal section on the plane indicated by the dotted line 4—4 on Fig. 3.

The hanger bracket 1 is desirably a steel casting with a hub 2 for the upright frame tube 3, a socket 4 for the end of the lower section of the frame, and a transverse opening 5 for the pedal shaft and guides. The shaft 6, at one end has a crank 7 adjacent to which is the sprocket 8, and at the other end has a crank 9. The crank 7 is usually rigidly attached to the shaft, and the crank 9 removably held on the shaft by a nut 10. The sprocket wheel is held in position by the lock nut 11. On the shaft near each end is a bushing 12. These bushings extend through guides, each of which has a face-flange 13 and hub 14. These hubs are of such size vertically that they fit the transverse opening in the bracket, but sidewise are smaller than the length of the opening in the bracket, so that they may be moved horizontally therein.

Pivoted to the bracket by studs 15 is a yoke shaped lever 16. A pin 17 is arranged to be thrust through an opening in the upper end of this lever and through perforations 18 in a fin 19 that extends upwardly from the bracket. The pin is desirably held in place by a cotter 20. Links 21 connect the lever on both sides with the shaft. The inner end of each of these links desirably encircles the bushing on the shaft, while the outer end is attached to the lever by a stud 22. A spring washer 23 is desirably arranged inside of the end of the crank 9 for holding the parts tight.

In order to locate the sprocket wheel in such position as to give the chain the desired tension, it is only necessary to withdraw the pin and swing the lever in the necessary direction and then thrust the pin through the lever and the registering perforation in the bracket fin. A pedal crank-shaft held in this manner is rigid and yet can very quickly and easily be moved horizontally the amount necessary to give the chain the desired tension, without throwing the shaft out of alinement or changing its level.

The invention claimed is:

1. A pedal crank hanger having a bracket adapted to be attached to a cycle frame, said bracket having a transverse opening, a crank shaft extending through said opening, which opening in diameter is larger than the diameter of the crank shaft whereby the shaft can be adjusted therein, a lever pivoted to the bracket, and a link connecting said lever with said shaft whereby a movement of the former will adjust the latter in said opening in the bracket.

2. A pedal crank-hanger having a bracket adapted to be attached to a cycle frame, said bracket having a transverse opening, guides movable in said opening, a shaft held by said guides, a lever pivoted to the bracket, and means connecting said lever and said shaft, whereby a movement of the former will adjust the latter.

3. A pedal crank-hanger adapted to be attached to a cycle frame and having an oblong transverse opening, guides movable horizontally in said opening, a crank shaft supported by said guides, a lever pivoted to the hanger, and links connecting said lever and said shaft, whereby a movement of the former will move the latter and its guides horizontally in the oblong transverse opening.

4. A pedal crank-hanger adapted to be attached to a cycle frame and having a transverse opening, a crank shaft extending through said opening, a yoke shaped lever pivoted to the hanger, means for holding the lever in desired adjustment, and links connecting said lever and the shaft.

5. A pedal crank-hanger adapted to be attached to a cycle frame and having an oblong transverse opening, guides movable horizontally in said opening, bushings in said guides, a crank shaft extending through said bushings, a yoke shaped lever with its ends pivoted to the hanger, means for holding the lever in desired adjustment, and links connecting said lever and the bushings on the shaft.

6. A crank hanger adapted to be attached to a cycle frame having a crank shaft movable horizontally of said hanger, a lever pivoted to said hanger, means for adjusting and fixing said lever, and links connecting said lever and the crank shaft.

7. A pedal crank hanger adapted to be attached to a cycle frame having an oblong transverse opening, guides movable horizontally in said opening, a crank shaft carried by said guides and extending through said opening, and levers and links for moving said guides and crank shaft horizontally in the transverse opening.

ALLAN McCLURE FLUHARTY.

Witnesses:
FREDERICK W. STARR,
FRANK B. RAU.

---

Copies of this patent may be obtained for five cents each, by addressing the "Commissioner of Patents. Washington, D. C."